United States Patent
Srivastava et al.

(10) Patent No.: US 12,505,232 B2
(45) Date of Patent: Dec. 23, 2025

(54) SYSTEM AND METHOD FACILITATING ENCRYPTION PRESERVING FORMAT AS A DISTRIBUTED PROCESSING LIBRARY

(71) Applicant: JIO PLATFORMS LIMITED, Ahmedabad (IN)

(72) Inventors: Shikhar Srivastava, Karnataka (IN); Raghuram Velega, Maharashtra (IN); Prem Kumar, Karnataka (IN); Pawan Kumar Kurmi, Karnataka (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 188 days.

(21) Appl. No.: 18/246,406

(22) PCT Filed: Jul. 27, 2022

(86) PCT No.: PCT/IB2022/056922
§ 371 (c)(1),
(2) Date: Mar. 23, 2023

(87) PCT Pub. No.: WO2023/007385
PCT Pub. Date: Feb. 2, 2023

(65) Prior Publication Data
US 2023/0359748 A1  Nov. 9, 2023

(30) Foreign Application Priority Data

Jul. 27, 2021  (IN) .............................. 202121033789

(51) Int. Cl.
*G06F 21/60*  (2013.01)
*G06F 21/31*  (2013.01)

(52) U.S. Cl.
CPC ............ *G06F 21/602* (2013.01); *G06F 21/31* (2013.01)

(58) Field of Classification Search
CPC ............................... G06F 21/602; G06F 21/31
(Continued)

(56) References Cited

U.S. PATENT DOCUMENTS

| 9,679,160 B1* | 6/2017 | Zhang | H04L 9/0894 |
| 2015/0143133 A1* | 5/2015 | Burnett | G06F 21/6209 |
| | | | 713/189 |

(Continued)

FOREIGN PATENT DOCUMENTS

WO  2016014152 A1  1/2016

OTHER PUBLICATIONS

NPL Search Terms (Year: 2024).*

(Continued)

*Primary Examiner* — Syed A Zaidi
(74) *Attorney, Agent, or Firm* — FINNEGAN, HENDERSON, FARABOW, GARRETT & DUNNER, LLP

(57) ABSTRACT

The present invention provides a robust and effective solution to an organization by enabling them to implement a system (110) for facilitating format preserving encryption capability such that the encrypted data will not be available with its original value in a big data system and render sensitive field data as non-sensitive. Thus, sensitive data may be hidden from data-stores/warehouses without worrying about downstream access to the data. The system (110) proposed may also preserve the data type and format of datasets but not limited to the like. The system encrypts a dataset with a unique key (404) and then allows a privileged user (902) to decrypt the encrypted dataset with the unique key (404) and view the decrypted values without getting access to the sensitive original dataset.

24 Claims, 11 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 2016/0019396 | A1* | 1/2016 | Davis | H04L 63/0807 |
| | | | | 713/193 |
| 2016/0080381 | A1* | 3/2016 | Hall | H04L 63/0884 |
| | | | | 726/7 |
| 2016/0224802 | A1* | 8/2016 | Arnold | G06F 21/6245 |
| 2017/0039568 | A1* | 2/2017 | Tunnell | G06F 21/33 |
| 2017/0061403 | A1* | 3/2017 | Reisgies | G06Q 20/401 |
| 2017/0272472 | A1* | 9/2017 | Adhar | G06F 21/602 |
| 2018/0279002 | A1* | 9/2018 | Cugi | H04N 21/4627 |
| 2019/0108357 | A1* | 4/2019 | Iyer | H04L 9/0618 |
| 2023/0275746 | A1* | 8/2023 | Griffin | H04L 9/0819 |
| | | | | 380/277 |
| 2024/0007280 | A1* | 1/2024 | Issa | G06F 21/602 |

OTHER PUBLICATIONS

International Search Report from International Appl. No. PCT/IB2022/056922, mailed Nov. 18, 2022.

BaoJiang Cui et al. "A data masking scheme for sensitive big data based on format-preserving encryption.", 2017 IEEE International Conference on Computational Science and Engineering (CSE) and IEEE, International Conference on Embedded and Ubiquitous Computing (EUC). vol. 1, pp. 518-524.

* cited by examiner

SYSTEM AND METHOD FACILITATING ENCRYPTION PRESERVING FORMAT AS A DISTRIBUTED PROCESSING LIBRARY

FIELD OF INVENTION

The embodiments of the present disclosure generally relate to data security field in big data analytics. More particularly, the present disclosure relates to a system and a method for facilitating format-preserving encryption as a distributed processing library.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In cryptography, encryption is the process of encoding information. This process converts the original representation of the information, known as plaintext, into an alternative form known as cipher-text. Only authorized parties can decipher a ciphertext back to plaintext and access the original information. An authorized recipient can easily decrypt the message with a key provided by the originator to recipients but not to unauthorized users. Format preserving encryption (or FPE), applies to encryption such that the output (cipher-text) is in the same format as the input (plaintext). Some common scenarios may be:

To encrypt a 16-digit credit card number (or bank account number) so that the cipher-text is another 16-digit number.

To encrypt an English word so that the cipher-text is another English word.

To encrypt an n-bit number (like 10-digit mobile number) so that the cipher-text is another n-bit number.

FPE is an important technique for preventing sensitive information such as Personally Identifiable Info (PII) to be exposed to the external world. FPE is especially crucial in the case of well-defined data models like Mobile/Cellular/Telephone Numbers in the Telecom sector or Bank Account Numbers/Credit Card Numbers in the Finance sector.

FPE algorithms can help avoid the disruptions associated with altered text formats. However, the characteristics of text/strings that have been cryptographically processed using FPE algorithms may be changed sufficiently to give rise to incompatibilities with software applications. FPE algorithms can ensure that an encrypted or decrypted text/string will contain only valid characters, but may not maintain desired relationships between those characters. For example, the checksum value that is associated with a credit card number may no longer be valid after the credit card number has been encrypted using an FPE algorithm. As another example, a string whose digits are required to be monotonically ascending may no longer satisfy this requirement following encryption or decryption using an FPE algorithm. In other situations, it can be challenging to properly handle data in a database where it is not clear which data items have been encrypted using an FPE algorithm and which items have remained unencrypted. It becomes more difficult in the big data ecosystem.

Currently, to secure the PII data in a typical Big Data Eco-system, existing security solutions readily available comprise of the following:

POSIX file systems permissions restricting access to data files

Security Groups & Service account-based Role Based Access Control (RBAC) to database/tables/columns via configurable access policies through various tools. This approach is restricted by data tag definitions and can get complicated very quickly as complex data models evolve. It is also a reactive approach and error prone where manual tagging needed after every table creation Distributed storage enabled Encryption Zones are expensive and brittle with limited support available for keeping sensitive data With all of the above, the data is still present in its original form and anyone with access to the data files or underlying disk(s) can read the sensitive data. Thus, most existing source systems often lack sensitive/PII information handling. Further, these systems do not adhere to the structured data present in the system thereby making downstream co-relation and analytical processing very difficult. It becomes vitally important for analytical systems where a lot of data-driven insights are derived from aggregates over datastores (data lakes) and actual access to the exact unencrypted data point may not be ever required.

There is therefore a need in the art to provide a method and system that can overcome the shortcomings of the existing prior art.

OBJECTS OF THE PRESENT DISCLOSURE

Some of the objects of the present disclosure, which at least one embodiment herein satisfy are as listed herein below.

It is an object of the present disclosure to provide a system and a method for facilitating enhanced authentication features to provide accuracy and security to enable sharing of personalized and customized information to the users.

It is an object of the present disclosure to provide a system and a method for converting sensitive data to non-sensitive without any need for complex hierarchical tagging-based access policies.

It is an object of the present disclosure to provide a system and a method that facilitates encryption and storage of data as it flows through the system.

It is an object of the present disclosure to provide a system and a method for downsampling original sensitive information to lower environments for building Machine Learning and AI-based Intelligent Systems without worrying about security aspects.

It is an object of the present disclosure to provide a system and a method to provide access to only authorized personnel to decrypt the sensitive information It is an object of the present disclosure to provide a system that is pluggable and configurable JVM-based library.

It is an object of the present disclosure to provide a system that is a Distributed Processing library (i.e. UDF) with support for alphanumeric and special characters.

It is an object of the present disclosure to provide a system and a method to restrict the flow of sensitive information in downstream big data analytical systems, by either Encryption at Source via lazy evaluation or Encryption at Source via eager evaluation.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for facilitating encryption preservation format as a distributed processing library. The system receives a set of data packets comprising decimal numbers, multi-lingual alphabets, and alphanumeric values from a database. Further, the system extracts an original dataset from the received set of data packets for encryption of the original dataset in the database. The original dataset comprises sensitive information. The original dataset is encrypted by using a unique key generated by a Key Management Service (KMS). The unique key is a cipher key of at least 128 kB, 256 kB, or 612 kB. The unique key is generated through SHA1 Hash Algorithm via distributed storage library.

Further, the system encrypts the extracted original dataset by using a Format Preserving Encryption (FPE) technique to generate an encrypted dataset of a same format and a same length associated with the original dataset in the database or in a database of faster accessibility. The encrypted dataset comprises one or more generated encrypted values obtained from the original dataset stored in a distributed data store by using a custom FPE user defined function (UDF). The original dataset is encrypted during runtime in a lazy evaluation approach of the FPE technique based on a request for encryption received from the user via the SQL interface provided to the user and one or more encrypted values of the encrypted dataset and a key value mapping are stored in the database of fast accessibility in an eager evaluation approach of the FPE technique.

Furthermore, the system provides an interface to a user to access the encrypted dataset for a regeneration of the original dataset from the encrypted dataset. The processor refers to the key value mapping in the database of fast accessibility for regeneration of the original dataset. The processor receives, via the interface provided to the user, an authentication information from the user for authentication of the user. The processor receives, via the interface provided to the user, a request for a unique key for decrypting the encrypted dataset from an authenticated user. The processor shares, via the interface provided to the user, a unique key for decrypting the encrypted dataset for an authenticated user.

In an aspect, the present disclosure provides a method for facilitating encryption preservation format as a distributed processing library. The method includes receiving, by a processor, a set of data packets comprising decimal numbers, multi-lingual alphabets, and alphanumeric values from a database. Further, the method includes extracting, by the processor, an original dataset from the received set of data packets for encryption of the original dataset in the database. The original dataset comprises sensitive information. The original dataset is encrypted by using a unique key generated by a Key Management Service (KMS). the unique key is a cipher key of at least 128 kB, 256 kB, or 612 kB. The unique key is generated through SHA1 Hash Algorithm via distributed storage library.

Further, the method includes encrypting, by the processor, the extracted original dataset by using a Format Preserving Encryption (FPE) technique to generate an encrypted dataset of a same format and a same length associated with the original dataset in the database or in a database of faster accessibility. The encrypted dataset comprises one or more generated encrypted values obtained from the original dataset by using a Distributed FPE user defined function (UDF). The original dataset is encrypted during runtime in a lazy evaluation approach of the FPE technique based on a request for encryption of the original dataset received from the user via the interface provided to the user. The original dataset is encrypted based on a request for encryption of the original dataset received from the user via the interface provided to the user and one or more encrypted values of the encrypted dataset and a key value mapping are stored in the database of faster accessibility in an eager evaluation approach of the FPE technique.

Furthermore, the method includes providing, by the processor, an interface to a user to access the encrypted dataset for a regeneration of the original dataset from the encrypted dataset. The processor refers to the key value mapping in the database of faster accessibility for regeneration of the original dataset. The processor receives, via the interface provided to the user, an authentication information from the user for authentication of the user. The processor receives, via the interface provided to the user, a request for a unique key for decrypting the encrypted dataset from an authenticated user. The processor shares, via the interface provided to the user, a unique key for decrypting the encrypted dataset for an authenticated user.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that disclosure of such drawings includes the invention of electrical components, electronic components, or circuitry commonly used to implement such components.

Figure 1:
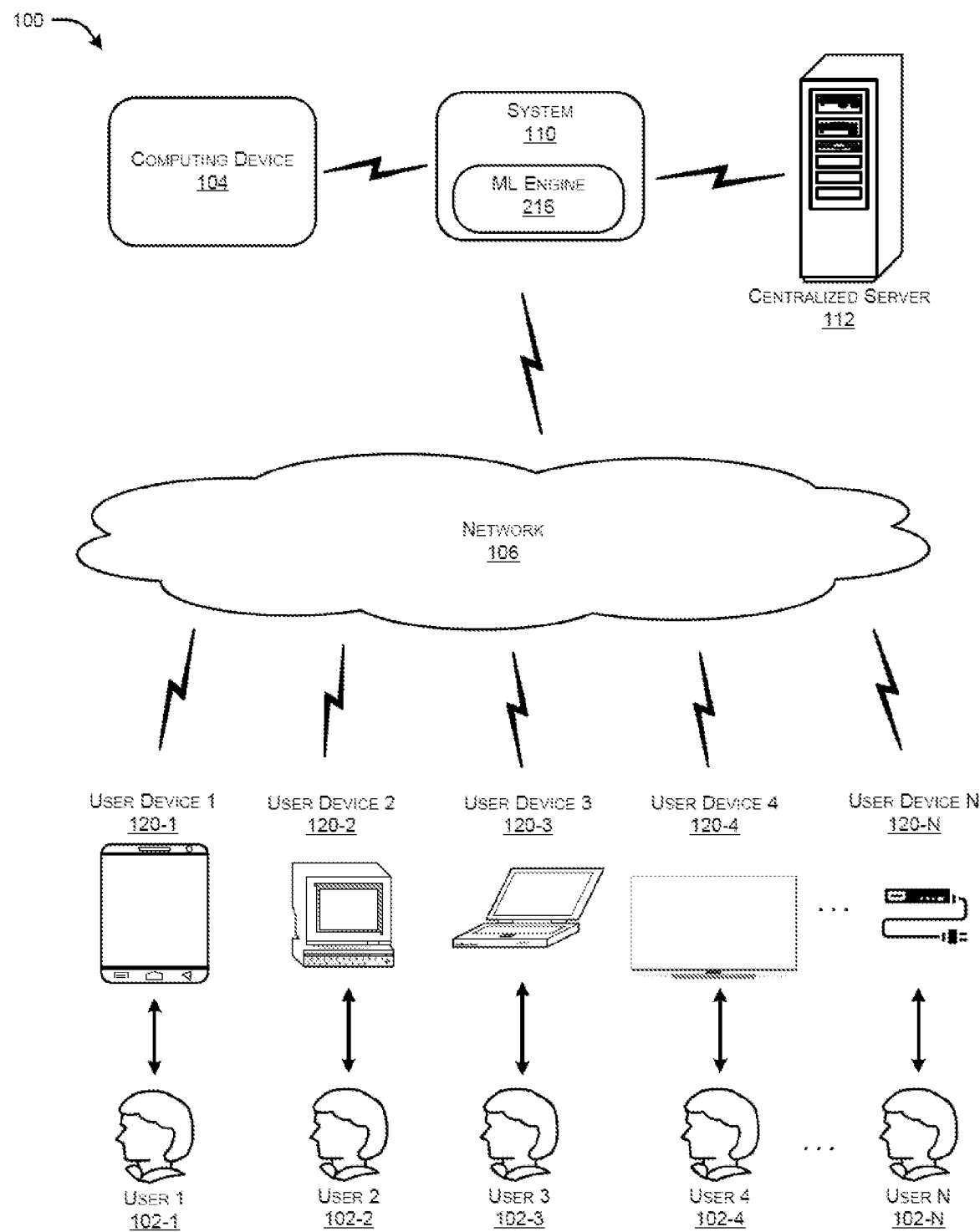
FIG. 1 illustrates an exemplary network architecture (100) in which or with which proposed system (110) of the present disclosure can be implemented, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention provides a solution to an entity or an organization by enabling them to implement a system for facilitating format preserving encryption capability as a distributed processing library. Format preserving encryption ensures that an encrypted value of a sensitive dataset will not be available with its original value in a big data system and render sensitive field data as non-sensitive. Thus, sensitive data may be hidden from datastores/data warehouses without worrying about downstream access to the data. The system and method proposed may also preserve the data type and format of datasets but not limited to the like.

Referring to FIG. 1 which illustrates an exemplary network architecture (100) in which or with which a system (110) of the present disclosure can be implemented, in accordance with an embodiment of the present disclosure. As illustrated in FIG. 1, by way of example but not limitation, the exemplary architecture (100) may include a user (102) associated with a user computing device (120) (also referred to as user device (120)), at least a network (106) and at least a centralized server (112). More specifically, the exemplary architecture (100) includes the system (110) equipped with a machine learning (ML) engine (216) for facilitating format-preserving encryption (FPE) for data that is not necessarily binary. The system (110) may be configured to receive a set of data packets. In an exemplary embodiment, the set of data packets may include any finite set of symbols such as decimal integers used in defining sensitive information (for example credit card numbers, Aadhaar card numbers but not limited to the like). The set of data packets may also include multi-lingual alphabets used in defining sensitive information (for example name, PAN Card, and the like) and a mix of alphabets and numeric values in defining sensitive information (for example Address, Email, and the like) but not limited to the like.

The system (110) may extract an original dataset pertaining to data to be encrypted and generate encrypted values for the dataset. In an embodiment, Format Preserving Encryption (FPE) may be used to generate the encrypted values of the dataset containing sensitive data fields.

The system (110) may be then configured to transform the dataset formatted as a sequence of symbols in such a way that the encrypted form of the dataset has a same format, including length, as the original dataset.

In an exemplary embodiment, the encrypted values of the dataset may be obtained by using a FPE user-defined function (UDF) but not limited to the like. This can be obtained by using a distributed Format Preserving Encryption library. The distributed Format Preserving Encryption library may convert sensitive fields containing values of type multilingual alphabets, decimal numerals, and special characters into the encrypted values.

In an embodiment, the centralized server (112) may include a database (210) that may store a knowledgebase having a set of potential identity information associated with the user (102) and corresponding encrypted values after encrypting the original dataset in a lazy evaluation approach of the FPE technique.

In an exemplary embodiment, the knowledge base may be in the form of a table but not limited to the like. The user device (120) may be communicably coupled to the centralized server (112) through the network (106) to facilitate communication therewith. As an example, and not by way of limitation, the network architecture (100) may include a second computing device (104) (also referred to as computing device hereinafter). The second computing device (104) may be operatively coupled to the centralized server (112) through the network (106).

In an embodiment, the centralized server (112) may also include a database of fast accessibility (222) that may store a key value mapping and the generated encrypted values after encrypting the original dataset in an eager evaluation approach of the FPE technique.

In an embodiment, the system (110) may further configure the ML engine (216) to generate, through an appropriately selected machine learning (ML) model in a way of example and not as a limitation, a trained model. The trained model may be configured to process the format preserving encryption, and read actual Personally Identifiable Information (PII) fields and corresponding encrypted values from the table (for example a customer master table). The trained model may be further configured to write the encrypted data into a faster storage layer for faster lookup. The trained model may enable lookup with the faster storage database to obtain the encrypted values of the actual sensitive field and add it to the existing dataset as a new field and write it into a destination dataset.

In an embodiment, the system (110) may be configured to obtain registration data based on a request from an unregistered user through a user device (120). In an exemplary embodiment, the login credentials may be generated based on an acknowledgment of the request and verification of the registration data. In another exemplary embodiment, the user (102) may enter the generated login credentials to access the system (110) through the user device (120) to obtain the information service associated with the user (102).

In an embodiment, the system (110) may be configured to allow registered and authorized users to regenerate the original value given an encrypted value on a one-off basis given a specific use-case, domain, and encrypted value. In an exemplary embodiment, a user interface may be operatively coupled to the user device (120). The user interface may allow users to regenerate the original value given an encrypted value with authentication and authorization control access for one-off requests.

In an embodiment, the system (110) may integrate with a source ingestion pipeline to write only the encrypted values into the computing devices (104) associated with the entity that may include downstream analytical systems but not limited to the like. As the dataset flows through an ingestion framework, the dataset may get encrypted and stored.

The computing device (104) may enable the user to store/access only the encrypted values in the system without exposing any sensitive fields.

In accordance with an embodiment and as illustrated in FIG. 1, on a user end, the architecture (100) can enable the user (102) to access information regarding an encryption/decryption key offered on their respective user devices (120) and obtain a visual response for the user query. In an embodiment, the user (102) can gain access to the system (110) only when he/she has been identified and authorized by the system (110). In an embodiment, the user (102) may include, but not limited to, an existing customer, a potential customer, a research analyst, or any other person interested to know about the services offered by the system (110).

In an embodiment, the computing device (104) and/or the user device (120) may communicate with the system (110) via a set of executable instructions residing on any operating system, including but not limited to, Android™, iOS™, Kai OS™ and the like. In an embodiment, the computing device (104) and/or the user device (120) may include, but not limited to, any electrical, electronic, electro-mechanical equipment or a combination of one or more of the above devices such as a mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as a touch pad, touch enabled screen, electronic pen and the like. It may be appreciated that the computing device (104) and/or the user device (120) may not be restricted to the mentioned devices and various other devices may be used. A smart computing device may be one of the appropriate systems for storing data and other private/sensitive information.

In an exemplary embodiment, the network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The network (106) may include, by way of example but not limitation, one or more of a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber-optic network, some combination thereof.

In another exemplary embodiment, the centralized server (112) may include or comprise, by way of example but not limitation, one or more of a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the system (110) may include one or more processors coupled with a memory. The memory may store instructions, which when executed by theone or more processors, may cause the system (110) to generate automated visual responses to a query.

Figure 2:
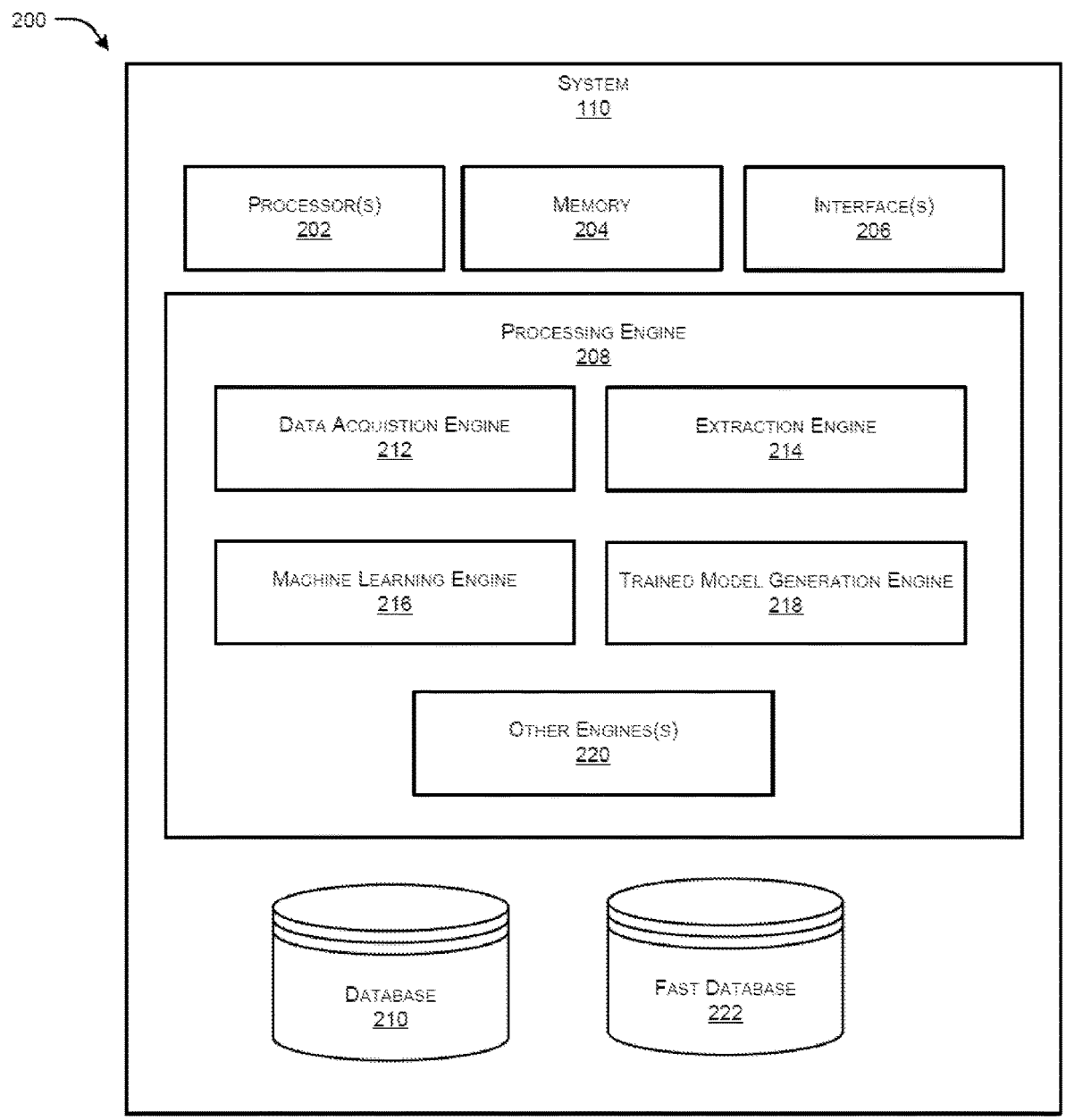
FIG. 2 illustrates an exemplary representation (200) of the system (110), in accordance with an embodiment of the present disclosure.

FIG. 2, with reference to FIG. 1, illustrates an exemplary representation (200) of the system (110) for facilitating format preserving encryption (FPE) based on a machine learning-based architecture, in accordance with an embodiment of the present disclosure. In an aspect, the system (110) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (206) of the system (110). The memory (204) may be configured to store one or more computer-readable instructions or routines in a non-transitory computer-readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) (206). The interface(s) (206) may comprise a variety of interfaces, for example, interfaces for data input and output devices, referred to as I/O devices, storage devices, and the like. The interface(s) (206) may facilitate communication of the system (110). The interface(s) (206) may also provide a communication pathway for one or more components of the system (110). Examples of such components include, but are not limited to, processing engine(s) (208), a database (210), and a fast database (222). The database (210) and the fast database (222) may include tables of different Database Management System languages. The database (210) and the fast database (222) may also include a distributed file system. The fast database (222) stores the encrypted values obtained by an encryption of the original dataset and a key value mapping of the encryption during an implementation of an eager evaluation approach of the format preservation encryption technique for encryption of the original dataset.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

The processing engine (208) may include one or more engines selected from any of a data acquisition engine (212), an extraction engine (214), a machine learning (ML) engine (216), a trained model generation engine (218) and other engines (220). In an embodiment, the data acquisition engine (212) of the system (110) can receive the set of data packets pertaining to any finite set of symbols such as decimal integers used in defining sensitive information, multi-lingual alphabets used in defining sensitive information, and a mix of alphabets and numeric values in defining sensitive information. The extraction engine (214) may extract the original dataset pertaining to data to be encrypted and the ML engine (216) may generate encrypted values for the dataset. The ML engine (216) may be further configured to transform the dataset formatted as the sequence of the symbols in such a way that the encrypted form of the dataset has the same format, including the length, as the original dataset. The ML engine (216) may be further configured to store a knowledgebase having a set of potential identity information associated with the user (102) and corresponding encrypted value in the database (210). The trained model generation engine (218) may be configured to generate, a machine learning (ML) model of the system, a trained model configured to process the format preserving encryption, and read actual Personally Identifiable Information fields and corresponding encrypted value.

Figure 3:
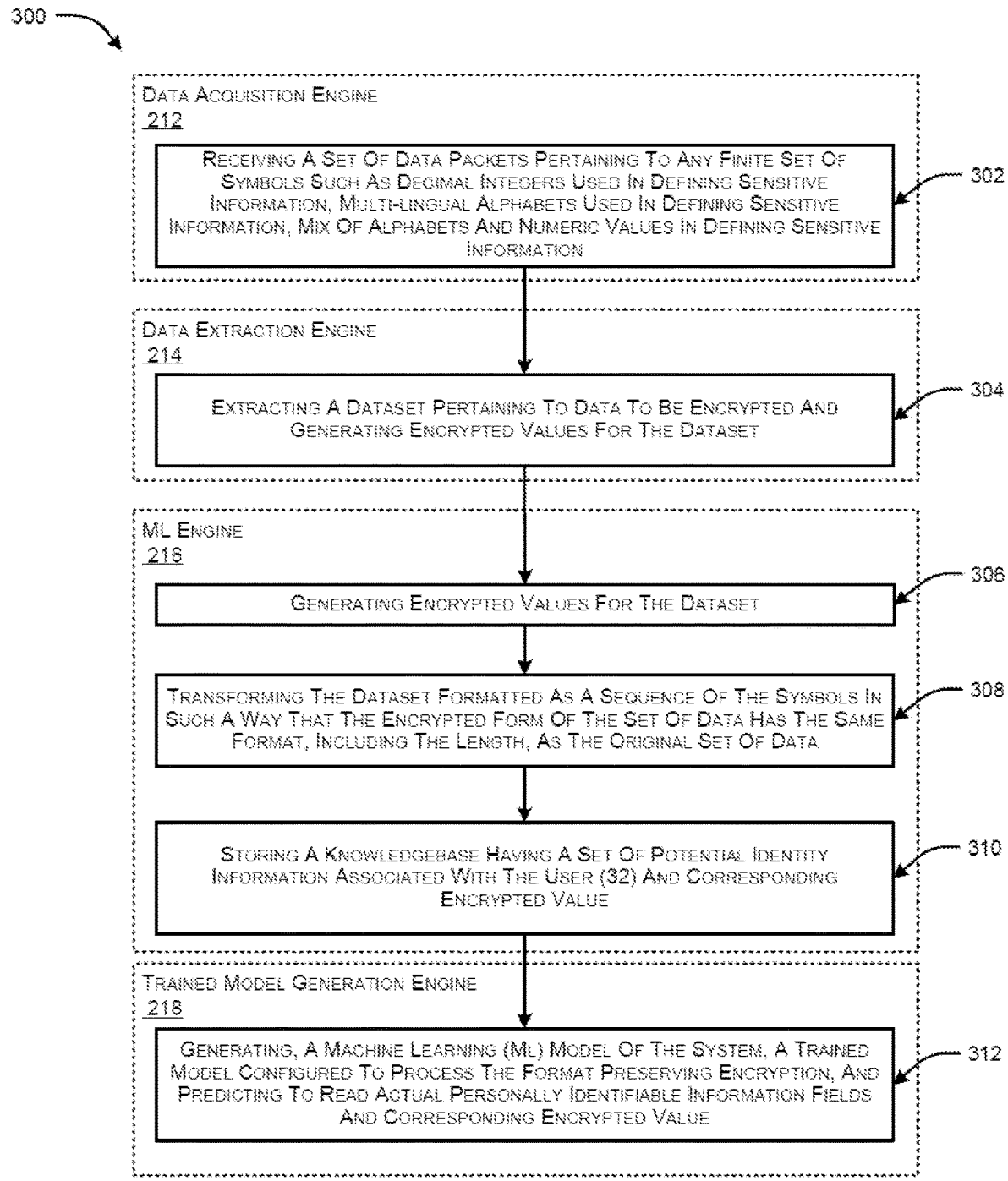
FIG. 3 illustrates an exemplary method flow diagram (300) depicting a method for facilitating format-preserving encryption (FPE), in accordance with an embodiment of the present disclosure.

FIG. 3 illustrates an exemplary method flow diagram (300) depicting a method for facilitating format-preserving encryption (FPE), in accordance with an embodiment of the present disclosure.

As illustrated, in an aspect the method may facilitate authorization on the bot through a series of steps. The method may include at (302), the step for receiving the set of data packets pertaining to any finite set of symbols such as decimal integers used in defining sensitive information, multi-lingual alphabets used in defining sensitive information, mix of alphabets and numeric values in defining sensitive information. The step (302) is executed by the Data acquisition engine (212). Further, the method may include at (304), the step for extracting a dataset pertaining to data to be encrypted by the Data extraction engine (214) and generating encrypted values for the dataset by the ML Engine (216) at step (306). Further, the method may include at (308), a step for transforming the dataset formatted as a sequence of the symbols in such a way that the encrypted form of the dataset has the same format, including the length, as the original dataset by the ML engine (216).

Furthermore, the method may include at (310), the step for storing, by the ML engine (216), the knowledgebase having the set of potential identity information associated with the user (102), and the corresponding encrypted value in the database (210) or in the fast database (222). Furthermore, the method may include at (312), the step for generating, the machine learning (ML) model of the system that is the trained model by the Trained model generation engine (218). The trained model may be configured to process the format preserving encryption and read actual Personally Identifiable Information fields and corresponding encrypted values.

Figure 4:
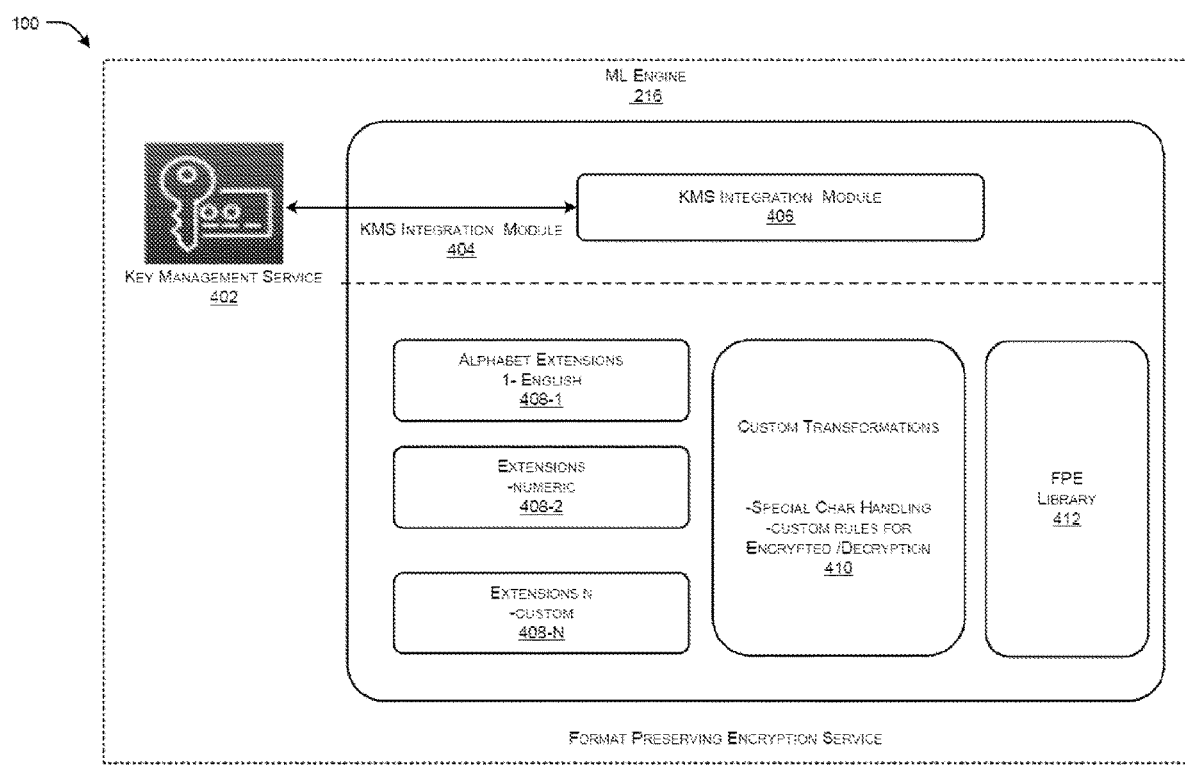
FIG. 4 illustrates an exemplary representation (400) of Format Preserving Encryption architecture and its implementation, in accordance with an embodiment of the present disclosure.

FIG. 4 illustrates an exemplary representation (400) of a Format Preserving Encryption architecture and its implementation, in accordance with an embodiment of the present disclosure.

As illustrated, the FPE architecture (400) may include a key management module (402) (also referred to as a Key Management Service (402) or KMS (402)) that may enable the encryption of the original dataset by the ML Engine (216). The KMS (402) may generate and provide a unique key (404) for encryption of the dataset and decryption of the encrypted values corresponding to the dataset. In an exemplary embodiment, the unique key (404) may be a cipher key of at least 128 kB, 256 kB, or 612 kB but not limited to it generated one-per-dataset-type. The unique key (404) may be generated through SHA1 Hash generated via distributed storage library. The unique key (404) may be generated to keep consistent behavior across massively parallel and distributed computing devices. The encrypted dataset may be integrated with the unique key (404) in a KMS integration module (406). The KMS integration module (406) may tweak by choosing an initialization vector as static but not limited to it and may use FF1 with at least 10 rounds but not limited to it. The KMS (402) may handle alphabet extensions (408-1), Decimal numerals (408-2), customized extensions (408-N), and the like. Special characters may be handled through custom encryption and decryption for custom transformations (410). The KMS (402) may delegate the call to any suitable FPE library (412) but not limited to it.

In an embodiment, a key value mapping between the original dataset and the FPE values may be stored in a faster storage layer but not limited to it. During ingestion the KMS (402) will do a lookup with the keys stored in the faster storage and may read FPE values and then may write only the FPE values into the fast database (222).

In an embodiment, authorized users may be allowed to regenerate the original value given an encrypted value.

In an exemplary implementation, a distributed computing system may include the following performance stats:
  Environment: JVM Process—1 CPU, 1.5 GB
  1 million random numbers (16 digits) were encrypted & decrypted in 2 minutes.
  1 million sample text strings (21 characters) were encrypted and decrypted in 10 minutes.

Figure 5:
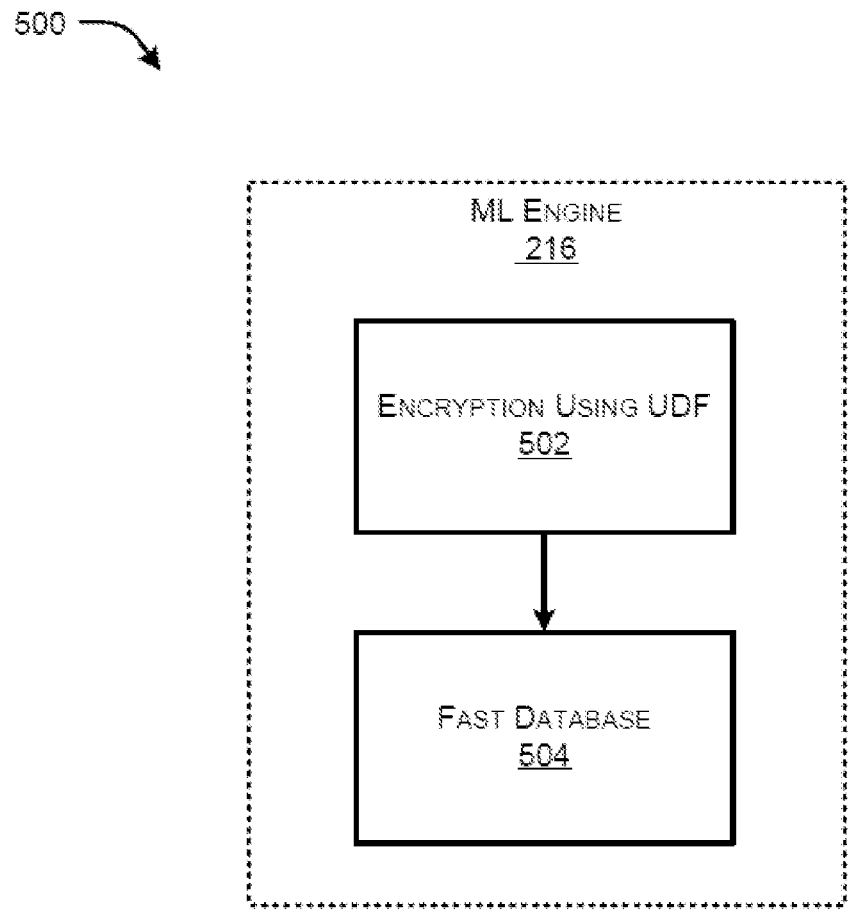
FIG. 5 illustrates an exemplary representation (500) of Format Preserving Encryption user-defined function, in accordance with an embodiment of the present disclosure.

FIG. 5 illustrates an exemplary representation (500) of Format Preserving Encryption user-defined function, in accordance with an embodiment of the present disclosure.

As illustrated, the FPE may be performed using a portable library in Big Data Platforms and accessible as a User Defined Function (502) in the ML Engine (216). The FPE using the UDF (502) may be operatively coupled to fast databases (504).

Figure 6:
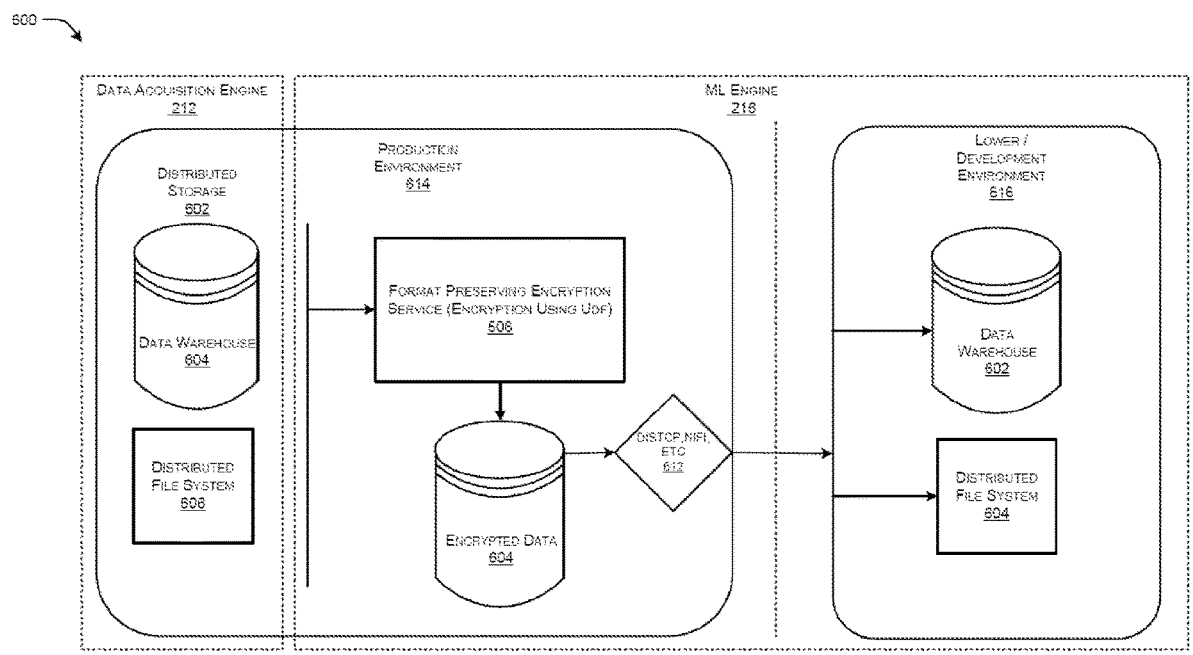
FIG. 6 illustrates an exemplary representation (600) of Format Preserving Encryption and its implementation, in accordance with an embodiment of the present disclosure.

FIG. 6 illustrates an exemplary representation (600) of Format Preserving Encryption and its implementation, in accordance with an embodiment of the present disclosure. As illustrated, the production environment (608) may include a distributed storage (602) where the set of data packets may be stored by the data acquisition engine (212). The distributed storage (602) may include a data warehouse (604). The distributed storage (602) may further include a distributed file system (606). The set of data packets may be transmitted from the distributed storage (602) for encryption to the Format preserving encryption module (506) in the ML Engine (216). The output of the Format preserving encryption module (506) may be the encrypted values. The encrypted values may be stored in an encrypted data warehouse (610). The encrypted values may be further processed for downsampling by nifi processor or distcp processor (612) and then transmitted to a development environment (614). The development environment (614) may include the data warehouse (616). The development environment (614) may also include a distributed file system (618) where the encrypted values with the same format and size as that of the original dataset may be stored.

In an exemplary embodiment, downsampling, encrypting, and moving the encrypted values to the development environment (614) may be done for training complex and sophisticated AI/ML-based Intelligent Systems for building data-driven insights.

Figure 7:
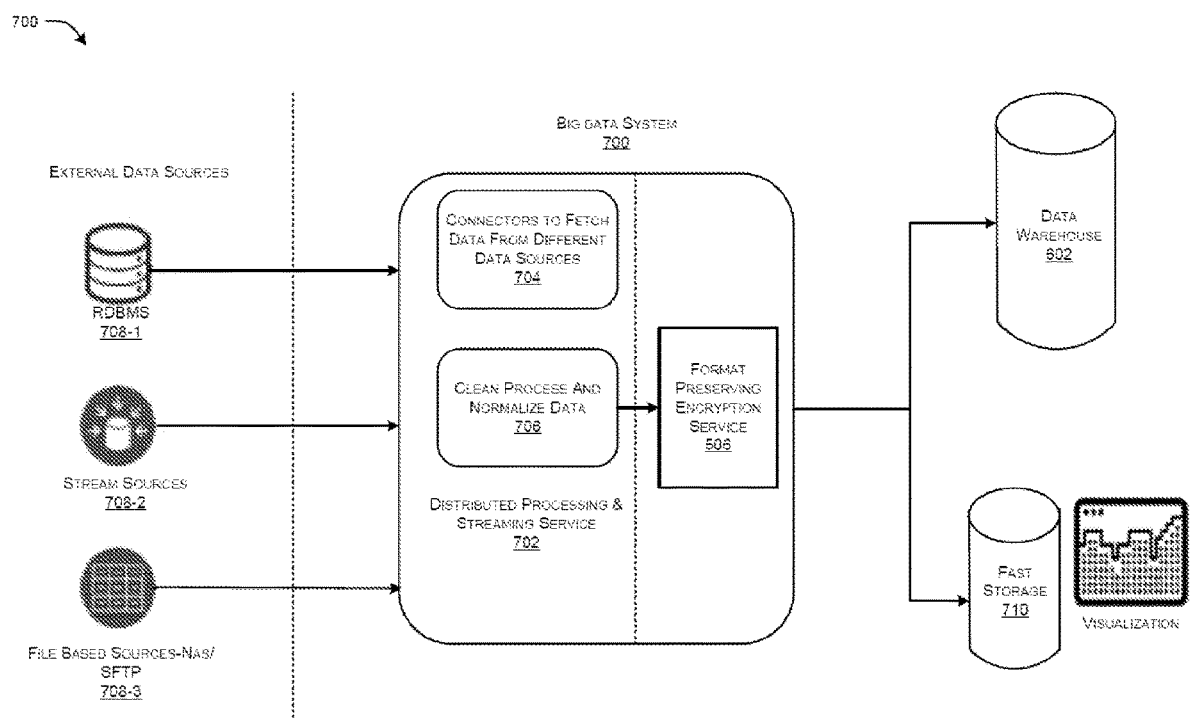
FIG. 7 illustrates an exemplary representation (700) of a traditional big data analytical system and its implementation, in accordance with an embodiment of the present disclosure.

FIG. 7 illustrates an exemplary representation (700) of a big data analytical system and its implementation, in accordance with an embodiment of the present disclosure. As illustrated, the big data analytical system (700) may include external data sources (708) such as RDBMS (708-1), stream sources (708-2) (kafka, syslog, MQ, and the like), and file-based sources (708-3). Data from the external sources (708) may be sent to a distributed processing and streaming service module (702) that may include connectors (704) to fetch the data from the external sources (708) after which the data may be cleaned, processed and normalized (706). The data may be then sent to the Format preserving encryption module (506). The output that may be the encrypted values may be stored in the data warehouse (610). The encrypted values may also be stored in a fast storage (710).

In an exemplary embodiment, the encryption may be done at the external sources (708) via lazy evaluation or FPE at runtime which may be a traditional way of doing 'Encryption at Source' i.e. data gets encrypted as it flows into the big data analytical system (700). This approach of doing encryption at runtime may be too costly for scenarios where the actual unique sensitive datasets may be limited/finite (for example unique credit card numbers or mobile numbers or bank accounts). However, the data flowing into Analytical Systems is more around user impressions, logs from applications and analytical sources where activity across various platforms for these accounts/users may be tracked and analytical insights may be drawn.

Figure 8:
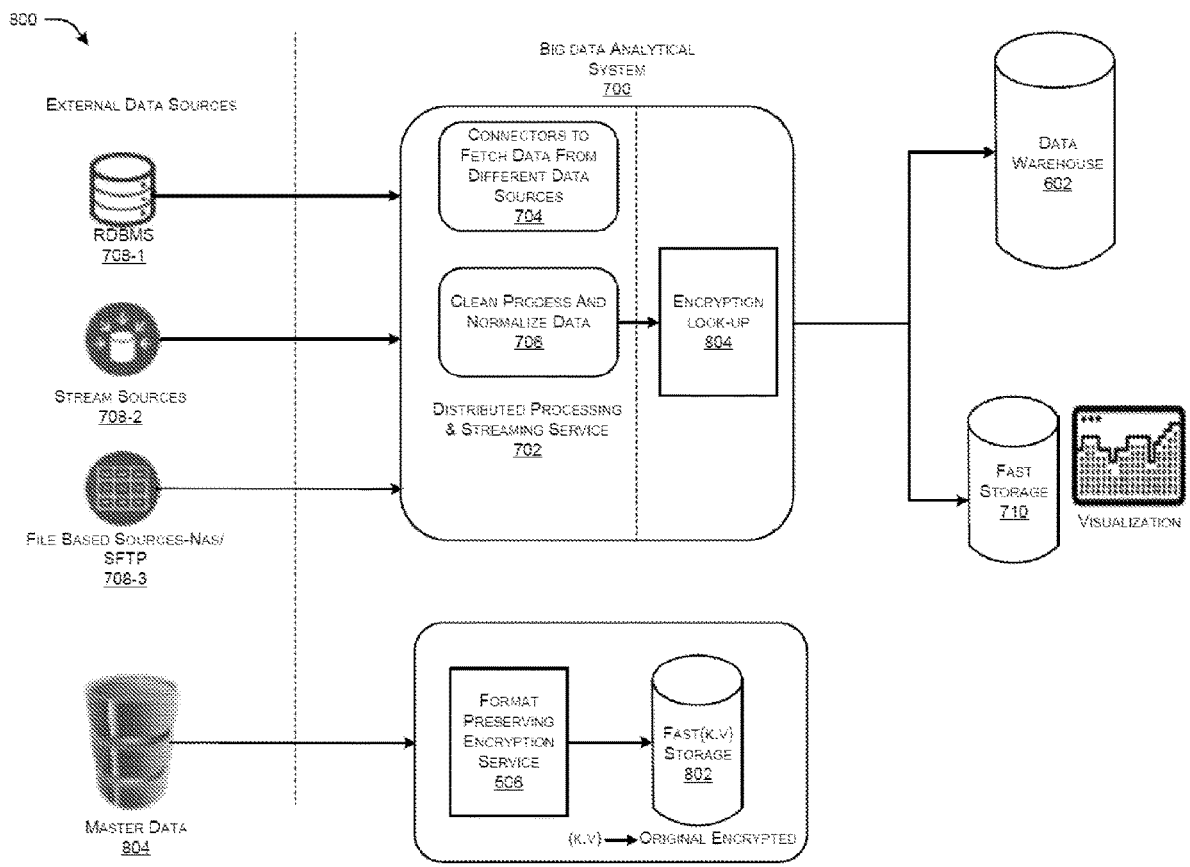
FIG. 8 illustrates an exemplary representation (800) of the proposed big data analytical system and its implementation, in accordance with an embodiment of the present disclosure.

FIG. 8 illustrates an exemplary representation (800) of the proposed big data analytical system (700) and its implementation, in accordance with an embodiment of the present disclosure. As illustrated, the big data analytical system (700) may further include an encryption look-up table (804) that may include the FPE (506) along with an encryption and decryption function (802) that produces the unique key and may be coupled to a master dataset (804).

In an exemplary embodiment, the encryption at the external sources (708) may happen via eager evaluation or FPE beforehand for predefined/finite datasets. The master dataset (804) may be precomputed and an FPE value of the master dataset (804) may be kept ready in the fast storage layer (710) for usage later on.

Figure 9:
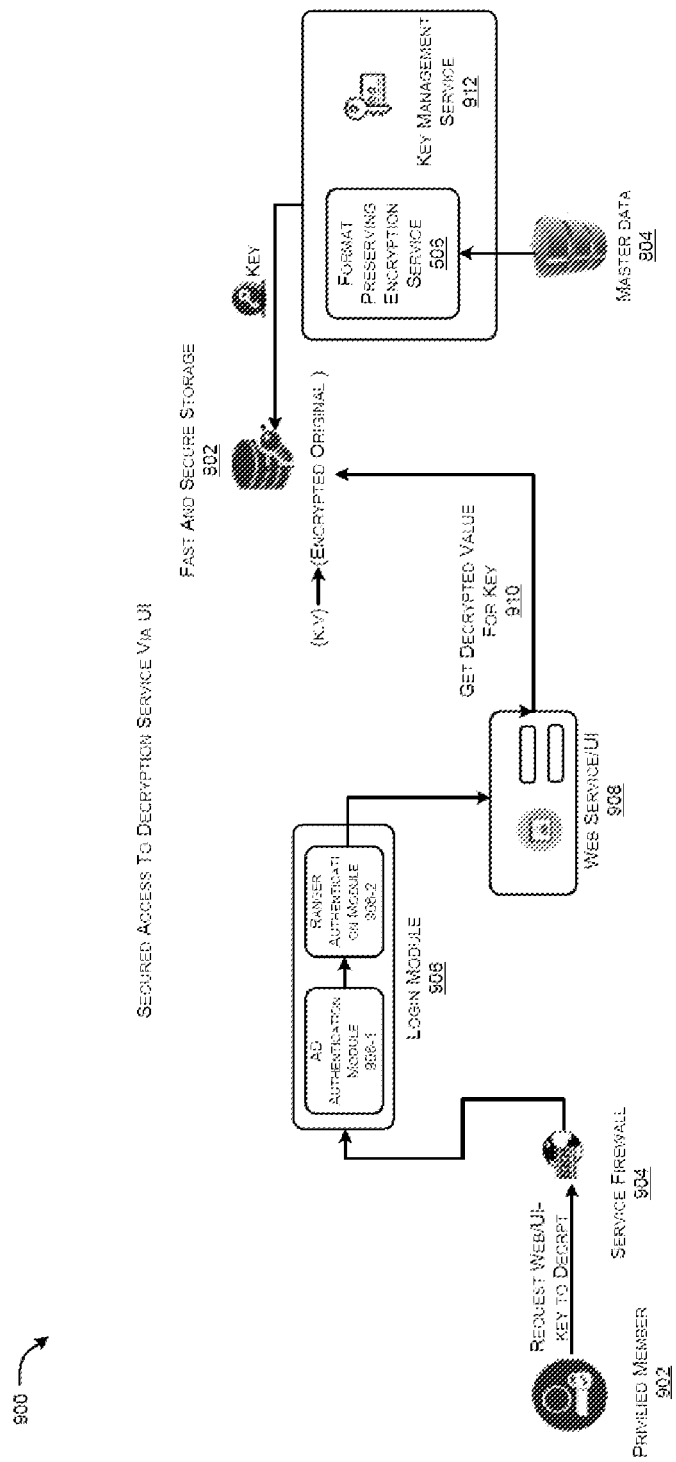
FIG. 9 illustrates an exemplary representation (900) of the flow process for secured access to decryption through the proposed big data analytical system, in accordance with an embodiment of the present disclosure.

FIG. 9 illustrates an exemplary representation (900) of the flow process for secured access to decryption through the proposed big data analytical system (700), in accordance with an embodiment of the present disclosure. As illustrated, in an embodiment, a user interface may be further provided to allow users to regenerate the original value given an encrypted value with authentication and authorization control access for one-off requests. A privileged member (902) may request the user interface (908) for a unique key (404) to decrypt the dataset. The privileged member (902) has to login at the login module (906) and then an authorization module (906-1) and ranger authorization module (906-2) will check for his credentials. If authorized, the privileged member (902) may get the unique key (404) for decryption (910) and the FPE system (506) will carry on its functions.

Figure 10:
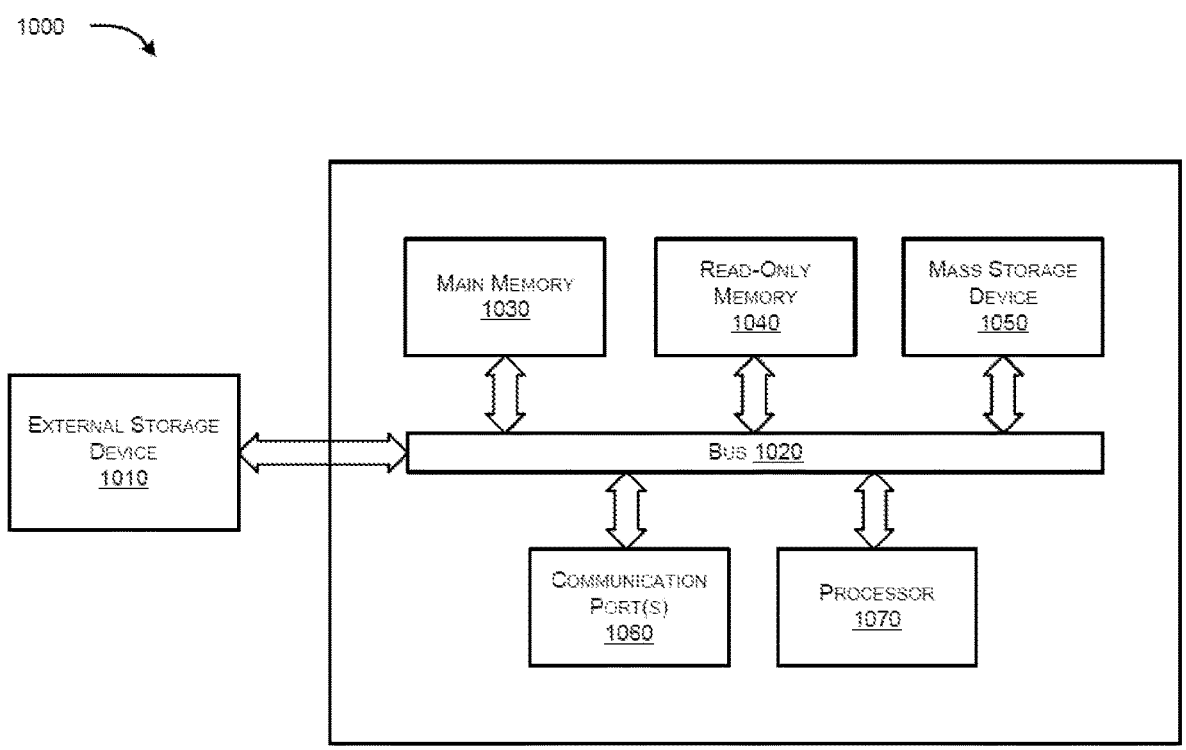
FIG. 10 illustrates an exemplary computer system (1000) in which or with which embodiments of the present invention can be utilized in accordance with embodiments of the present disclosure.

FIG. 10 illustrates an exemplary computer system in which or with which embodiments of the present invention can be utilized in accordance with embodiments of the present disclosure. As shown in FIG. 10, a computer system (1000) can include an external storage device (1010), a bus (1020), a main memory (1030), a read-only memory (1040), a mass storage device (1070), a communication port (1060), and a processor (1070). A person skilled in the art will appreciate that the computer system may include more than one processor and communication ports. Examples of the processor (1070) include, but are not limited to, an Intel® Itanium® or Itanium 2 processor(s), AMD® Opteron® or Athlon MP® processor(s), Motorola® lines of processors, FortiSOC™ system on chip processors or other future processors. Processor (1070) may include various modules associated with embodiments of the present invention. The communication port (1060) can be any of RS-232 port for use with a modem-based dialup connection, a 10/100 Ethernet port, a Gigabit, or 10 Gigabit port using copper or fiber, a serial port, a parallel port, or other existing or future ports.

The communication port (1060) may be chosen depending on a network, such as a Local Area Network (LAN), Wide Area Network (WAN), or any network to which the computer system (1000) connects. The memory (1030) can be Random Access Memory (RAM), or any other dynamic storage device commonly known in the art. The read-only memory (1040) can be any static storage device(s) e.g., but not limited to, a Programmable Read Only Memory (PROM) chips for storing static information e.g., start-up or BIOS instructions for the processor (1070).

The mass storage (1050) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors.

The bus (1020) communicatively couples the processor(s) (1070) with the other memory, storage, and communication blocks. Bus (1020) can be, e.g. a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects the processor (1070) to the computer system (1000).

Optionally, operator and administrative interfaces, e.g. a display, keyboard, joystick and a cursor control device, may also be coupled to the bus (1020) to support direct operator interaction with a computer system. Other operator and administrative interfaces can be provided through network connections connected through the communication port (1060). The external storage device (1010) can be any kind of external hard drive, floppy drive, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Figure 11:
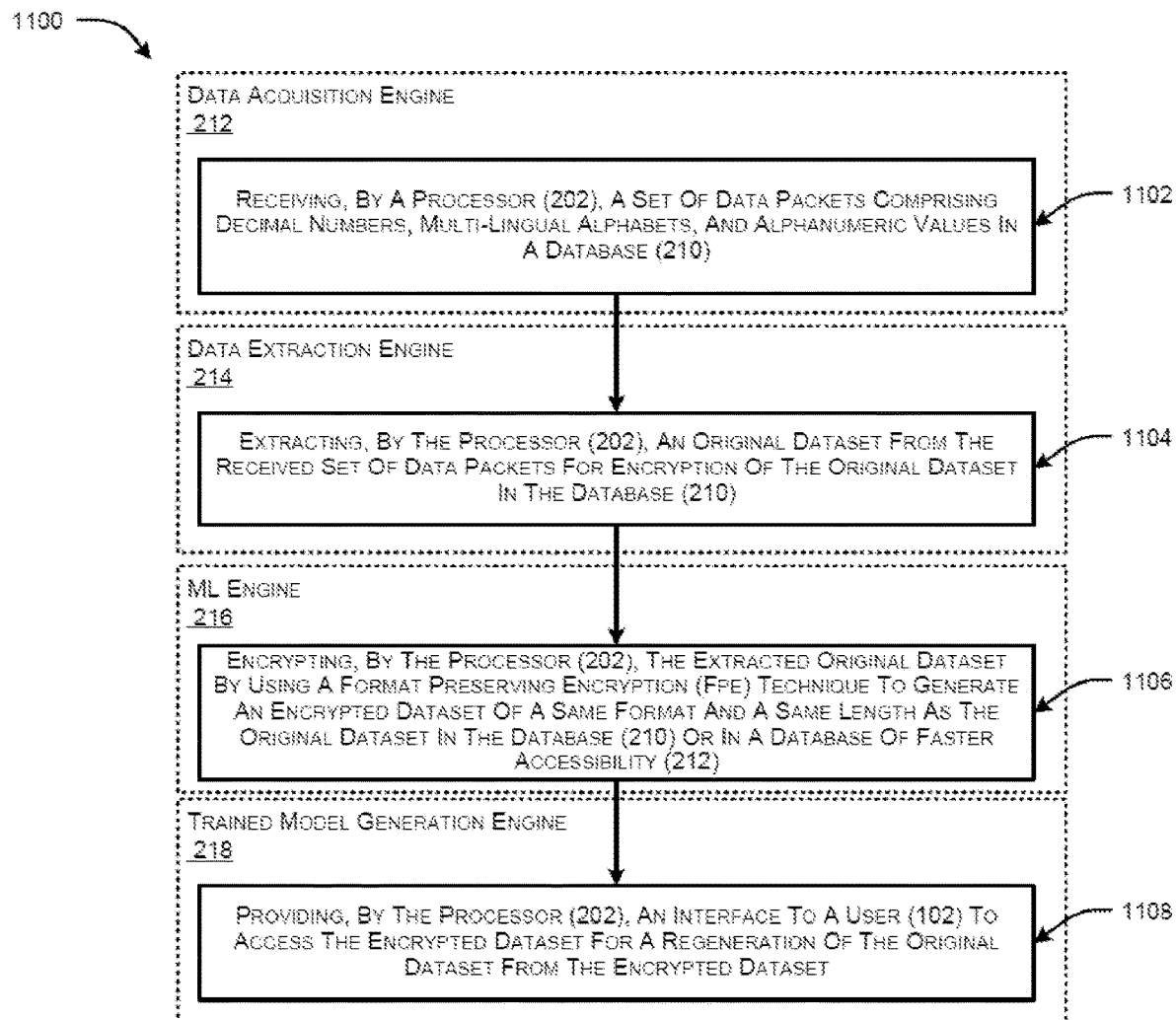
FIG. 11 illustrates an exemplary method flow chart (1100) depicting a method for facilitating encryption preservation format, in accordance with an embodiment of the present disclosure.

FIG. 11 illustrates an exemplary method flow chart (1100) depicting a method for facilitating encryption preservation format, in accordance with an embodiment of the present disclosure. The method (1100) may be described in the general context of computer-executable instructions. Generally, computer-executable instructions can include routines, programs, objects, components, data structures, procedures, modules, and functions, which perform functions or implement abstract data types.

The order in which the method (1100) is described is not intended to be construed as a limitation, and any number of the described method blocks can be combined in any order to implement the method (1100). Additionally, individual blocks may be deleted from the methods without departing from the scope of the subject matter described herein. Furthermore, the method (1100) can be implemented in any suitable hardware, software, firmware, or combination thereof.

At block (1102), the method may include receiving, by a processor (202), a set of data packets comprising decimal numbers, multi-lingual alphabets, and alphanumeric values from a database (210).

At block (1104), the method may include extracting, by the processor (202), an original dataset from the received set of data packets for encryption of the original dataset in the database (210). The original dataset comprises sensitive information. The original dataset is encrypted by using a unique key (404) generated by a Key Management Service (KMS) (402). The unique key (404) is a cipher key of at least 128 kB, 256 kB, or 612 kB. The unique key (404) is generated through SHA1 Hash via distributed storage libraries.

At block (1106), the method may include encrypting, by the processor (202), the extracted original dataset by using a Format Preserving Encryption (FPE) technique to generate an encrypted dataset of a same format and a same length as the original dataset in the database (210) or in a database of faster accessibility (222). The encrypted dataset comprises one or more generated encrypted values obtained from the original dataset by using a FPE user defined function (UDF). The original dataset is encrypted during runtime by a lazy evaluation approach of the FPE technique. The original dataset is encrypted and one or more encrypted values of the encrypted dataset and a key value mapping are stored in the database of fast accessibility (222) by an eager evaluation method of the FPE technique. The key value mapping in the database of fast accessibility (212) is referred to for regeneration of the original dataset.

At block (1108), the method may include providing, by the processor (202), an interface to a user (102) to access the encrypted dataset for a regeneration of the original dataset from the encrypted dataset. The processor (202) refers to the key value mapping in the database of fast accessibility (222) for regeneration of the original dataset. The processor (202) receives, via the interface provided to the user (102), the authentication information from the user (102) for authentication of the user (102). The processor (202) receives, via the interface provided to the user (102), a request for the unique key for decrypting the encrypted dataset from an authenticated user. The processor (202) shares, via the interface provided to the user (102), the unique key for decrypting the encrypted dataset for the authenticated user.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Key Advantages

The present disclosure provides a unique solution for format preserving encryption by simplistic access policy rules in a Big Data Ecosystem instead of complex hierarchical tag-based access policies. The system employs a first-class integration as a User Defined Function and JVM-based library in the Big Data Ecosystem. Different entities, such as telecom organizations, have a finite amount of sensitive information of customers such as Name, PAN card, Aadhaar card number, mobile number. The number of activity logs that these finite users can create is immense. The proposed method becomes an instrumental tool in encrypting this log-based sensitive information before these sources are streamed into a central repository (Data Lake) using Eager Encryption at Source Pattern.

An advantage of the present disclosure is that it provides a solution for call muting analysis. The system uses the encrypted customer-to-tower latching data for this analysis and shares the encrypted data with third-party vendor for receiving insights on the call muting issue.

Another advantage of the present disclosure is that it provides a solution for network quality analysis. The system uses encrypted network data to obtain insights into network strength and find out the weak network coverage areas.

Another advantage of the present disclosure is that it provides a solution for customer impression analysis. The system uses encrypted deep packet inspection (DPI) data to obtain insights into impressions created upon customers by analyzing the most visited websites by users.

Another advantage of the present disclosure is that it provides a solution for the downsampling of Active Development Encrypted data. The data may be brought down to a lower environment and used by developers to develop/train Intelligent Systems & various analytical pipelines.

RESERVATION OF RIGHTS

A portion of the disclosure of this patent document contains material, which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The present disclosure may pertain to 3GPP specifications such as for example 3GPP TS 29.198-04-5, version 9.0.0, Release 9.

We claim:

1. A system for facilitating encryption preservation format as a distributed processing library, the system comprising:
   a processor; and
   a memory coupled to the processor, wherein the memory comprises processor-executable instructions, which on execution, causes the processor to:
   receive a set of data packets comprising decimal numbers, multi-lingual alphabets, and alphanumeric values from a database;
   extract an original dataset from the received set of data packets for encryption of the original dataset in the database;
   encrypt the extracted original dataset by using a Format Preserving Encryption (FPE) technique to generate an encrypted dataset of a same format and a same length associated with the original dataset in the database and in a database of fast accessibility; and
   provide an interface to a user to access the encrypted dataset for a regeneration of the original dataset from the encrypted dataset.

2. The system of claim 1, wherein the original dataset comprises sensitive information.

3. The system of claim 1, wherein the original dataset is encrypted by using a unique key generated by a Key Management Service (KMS).

4. The system of claim 3, wherein the unique key is a cipher key of at least 128 kB, 256 kB, or 612 kB.

5. The system of claim 3, wherein the unique key is generated through SHAI Hash via distributed storage libraries.

6. The system of claim 1, wherein the encrypted dataset comprises one or more generated encrypted values obtained from the original dataset by using a FPE user defined function (UDF).

7. The system of claim 1, wherein the original dataset is encrypted during runtime in a lazy evaluation approach of the FPE technique based on a request for encryption of the original dataset received by the processor from the user via the interface provided to the user, wherein the lazy evaluation approach comprises encrypting the original dataset as it flows into a big data analytical system.

8. The system of claim 1, wherein the original dataset is encrypted based on a request for encryption of the original dataset received from the user by the processor via the interface provided to the user and one or more encrypted values of the encrypted dataset and a key value mapping are stored in the database of fast accessibility in an eager evaluation approach of the FPE technique, wherein the eager evaluation approach comprises encrypting the original dataset beforehand for predefined/finite datasets.

9. The system of claim 8, wherein the processor refers to the key value mapping in the database of fast accessibility for regeneration of the original dataset.

10. The system of claim 1, wherein the processor receives, via the interface provided to the user, an authentication information from the user for authentication of the user.

11. The system of claim 1, wherein the processor receives, via the interface provided to the user, a request for a unique key for decrypting the encrypted dataset from an authenticated user.

12. The system of claim 1, wherein the processor shares, via the interface provided to the user, a unique key for decrypting the encrypted dataset for an authenticated user.

13. A method for facilitating encryption preservation format as a distributed processing library, the method comprising:
   receiving, by a processor, a set of data packets comprising decimal numbers, multi lingual alphabets, and alphanumeric values from a database;
   extracting, by the processor, an original dataset from the received set of data packets for encryption of the original dataset in the database;

encrypting, by the processor, the extracted original dataset by using a Format Preserving Encryption (FPE) technique to generate an encrypted dataset of a same format and a same length associated with the original dataset in the database and in a database of fast accessibility; and providing, by the processor, an interface to a user to access the encrypted dataset for a regeneration of the original dataset from the encrypted dataset.

14. The method of claim 13, wherein the original dataset comprises sensitive information.

15. The method of claim 13, comprising encrypting the original dataset by using a unique key generated by a Key Management Service (KMS).

16. The method of claim 15, wherein the unique key is a cipher key of at least 128 kB, 256 kB, or 612 kB.

17. The method of claim 15, comprising generating the unique key through SHAI Hash via distributed storage libraries.

18. The method of claim 13, wherein the encrypted dataset comprises one or more generated encrypted values obtained from the original dataset by using a FPE user defined function (UDF).

19. The method of claim 13, comprising encrypting the original dataset during runtime in a lazy evaluation approach of the FPE technique based on a request for encryption of the original dataset received from the user by the processor via the interface provided to the user, wherein the lazy evaluation approach comprises encrypting the original dataset as it flows into a big data analytical system.

20. The method of claim 13, comprising encrypting the original dataset based on a request for encryption of the original dataset received from the user by the processor via the interface provided to the user and one or more encrypted values of the encrypted dataset and a key value mapping are stored in the database of fast accessibility in an eager evaluation approach of the FPE technique, wherein the eager evaluation approach comprises encrypting the original dataset beforehand for predefined/finite datasets.

21. The method of claim 20, wherein the processor refers to the key value mapping in the database of fast accessibility for regeneration of the original dataset.

22. The method of claim 13, comprising receiving by the processor, via the interface provided to the user, an authentication information from the user for authentication of the user.

23. The method of claim 13, comprising receiving by the processor, via the interface provided to the user, a request for a unique key for decrypting the encrypted dataset from an authenticated user.

24. The method of claim 13, comprising sharing, by the processor, via the interface provided to the user, a unique key for decrypting the encrypted dataset for an authenticated user.

* * * * *